Patented Feb. 13, 1934

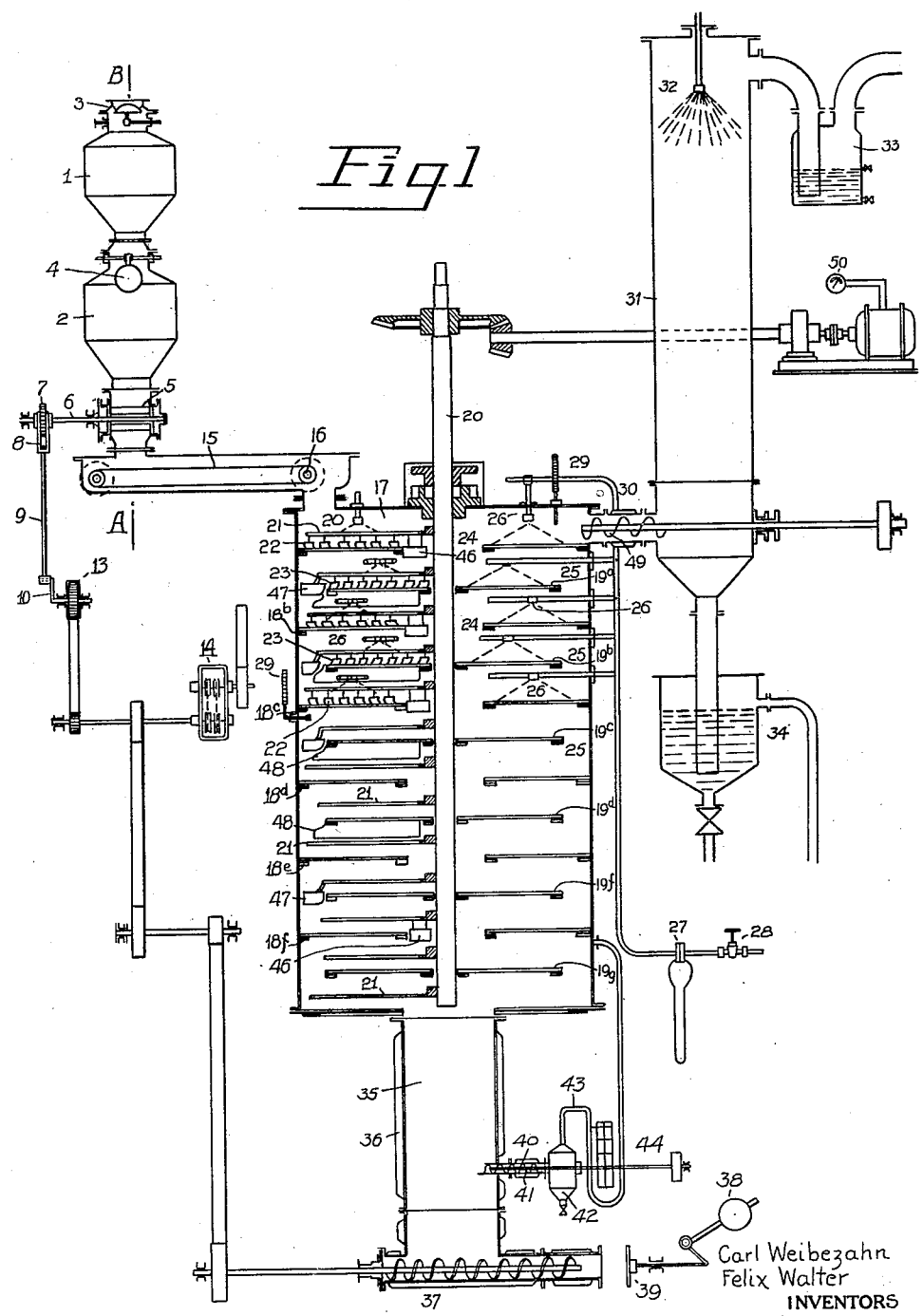

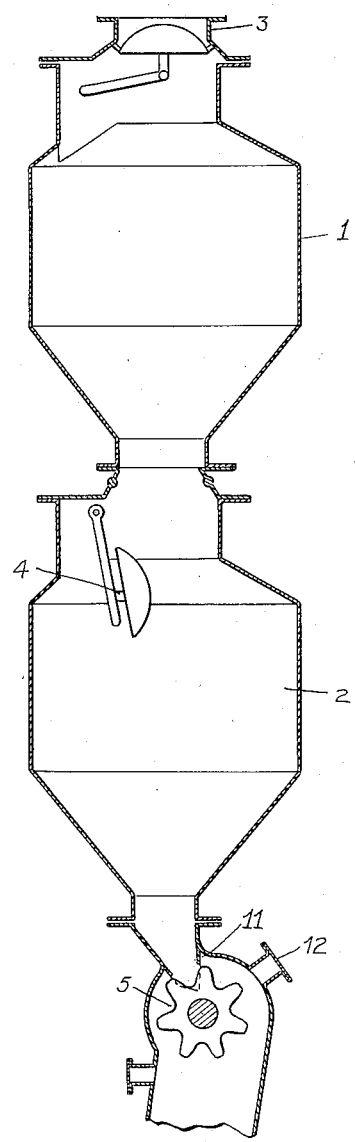

1,947,120

UNITED STATES PATENT OFFICE 1,947,120

APPARATUS FOR PREPARING ACETYLENE AND SIMULTANEOUSLY PRODUCING SUBSTANTIALLY DRY CALCIUM HYDROXIDE

Karl Weibezahn and Felix Walter, Knapsack, near Cologne-on-the-Rhine, Germany, assignors to Aktiengesellschaft für Stickstoffdünger, Knapsack, near Cologne-on-the-Rhine, Germany Application September 24, 1930, Serial No. 484,112, and in Germany February 14, 1928

6 Claims. (Cl. 48—38)

The present invention relates to an apparatus for preparing acetylene and simultaneously producing substantially dry calcium hydroxide.

The object of our invention is the provision of a generator which makes it possible to obtain a complete yield of acetylene from calcium carbide and water and which permits of a continuous and thorough mixing of the calcium carbide and at the same time provides for the introduction of the calcium carbide and water in a suitable form and removal of the acetylene and the calcium hydroxide produced. The generators hitherto used for this purpose are accompanied by several disadvantages, chief among which is the unavoidable loss of gas, a serious clogging of the apparatus by the calcium hydroxide produced, making frequent interruptions of the process necessary for cleaning the apparatus, and the admixture of a large quantity of water with the calcium hydroxide produced. It is, therefore, a further object of our invention to provide a generator which will not have these objectionable features.

By employing the generator according to this invention a complete yield of acetylene can be obtained from calcium carbide and water without any danger, while there is simultaneously produced a substantially dry calcium hydroxide.

The generator according to our invention which has the form of a plate device as illustrated in the accompanying drawings has been found to be particularly useful. Large quantities of calcium carbide can be worked up therewith in a continuous operation without any danger and loss.

Further objects and advantages of our invention will be apparent from the following detailed description of the accompanying drawings, Figure 1 representing a front elevation of the generator and Figure 2 representing a section through the longitudinal axis of A—B of the receptacles for carbide.

Calcium carbide, after being continuously conveyed to the generator without any loss of gas, is introduced into the receptacles 1 and 2 provided with gas-tight gates 3 and 4. When the calcium carbide contained in the receptacle 2 is worked up, the gate 4 is shut and the gate 3 is open. Fresh calcium carbide can then be filled into the receptacle 1. The calcium carbide is conveyed to the receptacle 2 after shutting the gate 3 and opening the gate 4. The calcium carbide is distributed by means of the bucket wheel 5 which consists for instance of seven chambers of equal size. The shaft 6 of the bucket wheel 5 provided with a stuffing-box has a cog wheel 7 having seven cogs or a multiple thereof. The shaft of the bucket wheel is driven by a movable pawl 8 moved by the connecting piece 9. The latter is pivotally mounted on the eccentric device 10 adjustable in such a way that with a seven-part bucket wheel the seventh part of the cogs of the cog wheel 7 is moved by every single stroke, whereby it is possible that, when the apparatus is stopped, a chamber of the bucket wheel is uniformly filled from the receptacle 2 containing calcium carbide. The receptacle tapers downwards to the cross section of a chamber. By the protective sheets 11 the calcium carbide is prevented from falling outside the chamber. For controlling the amount of calcium carbide to be charged a glass 12 illuminated from outside is inserted. The eccentric device 10 is driven by the sprocket wheel 13 from the revolution regulator 14. By the latter the introduction of the calcium carbide is regulated in the desired manner. The calcium carbide falls from the bucket wheel 5 on the conveyor belt 15 which is driven by the shaft 16 provided with the stuffing box and which serves for conveying the calcium carbide into the cylindrical generator 17.

In this generator a number of fixed annular plates is arranged in superimposed spaced relation concentric with shaft 20. Plates $18a$, $18b$, $18c$, etc. have an outer diameter sufficiently large to fit closely to the wall of the generator and an inner diameter of sufficient size to leave annular openings 24 between said plates and shaft 20. Plates $19a$, $19b$, $19c$, etc. have an inner diameter sufficiently small to fit closely around the shaft 20, and an outer diameter sufficiently small to leave annular openings 25 between said plates and the wall of the generator.

The shaft 20 provided with a stuffing box carries the stirring arms 21 to which blades 22 adapted to move the material under treatment toward the center of the generator, and blades 23, adapted to move said material toward the periphery of the generator are fastened. The calcium carbide on the plate $18a$ is moved by the stirrer in a helical manner toward the center of the generator and falls through the circular opening 24 onto the plate $19a$ placed below plate $18a$, wherefrom the material is conveyed toward the periphery of the generator and falls at the edge at 25 through the space between the plate and the wall of the generator onto the plate $18b$ below and so on. By means of the nozzles 26 mounted above the plates, the water required for the gasification of the carbide and the dissipation of the reaction heat, controlled by the fluid flow meter 27 and regulated by the valve 28, is uniformly distributed over the calcium carbide in form of a fine spray. By the heat of evaporation of the water added in excess the reaction heat evolved during the decomposition of the carbide is rendered completely innocuous. By thoroughly mixing the mass every overheating is prevented, so that nowhere in the generator does the temperature exceed 100° C. The temperature of the escaping acetylene which is admixed with water vapor is indicated by thermometers 29. The acetylene produced leaves the generator at 30, passes through the cooling tower 31, which is sprayed, with water by means of the nozzle 32, and the washer 33 to the place of use. 34 is a water seal for removing the cooling water.

The calcium carbide converted into substantially dry calcium hydroxide by the action of the gasification water, finally arrives at the chamber 35 mounted below the generator. For preventing the incrustation of chamber 35, it is surrounded by a heating jacket 36. By means of the endless screw 37 provided with a stuffing box whose driving member is coupled with the revolution regulator 14 for charging the calcium carbide, the calcium hydroxide is continuously removed without any loss of gas, against the pressure of the weighted door 39 yieldingly retained in closed position by the movable weight 38. The gas-tight closing can likewise be obtained by keeping the calcium hydroxide in a certain height in the chamber 35, and removing the calcium hydroxide through an ordinary endless screw. Furthermore the calcium hydroxide can continuously be taken from the chamber 35 in the form of briquettes by means of a press device.

For ascertaining the height of the lime in the chamber 35, several devices may be used or combined with each other.

As small quantities of free water or water vapor are always present in the calcium hydroxide which can only partly evaporate in the heated chamber 35 on account of the calcium hydroxide being superposed, the height of the lime can easily be ascertained by determinating the pressure at one or several parts of the chamber 35. It is advantageous to mount a small endless screw 41 provided with a dust separator 42 into the measuring branch 40 of the chamber to return the calcium hydroxide that may be dropped or carried along with the acetylene into the chamber and to prevent the pipe 43 from becoming choked. If the pressure is determined by means of a U-shaped bent glass-manometer 44 which can, for instance, be filled with mercury, one of the arms is connected with the pipe 43 and the other arm with a measuring branch 45 to the generator. The height of the lime in the chamber can then easily be determined by a differential measurement, because the pressure exerted by steam is a multiple of that in the generator.

Compared with the known plate devices as they are used, for instance for preparing chloride of lime and for slaking burnt lime, the generator according to the present invention is modified corresponding to the particular properties of the calcium hydroxide obtainable by the gasification of the calcium carbide.

With regard to the property of the calcium hydroxide easily to adhere to and to form incrustations on surfaces, there are mounted at the ends of the stirring arms 21 sheets 46 and 47 extending upwardly and downwardly beyond the edge of the plate corresponding to the particular arm; by the action of said sheets the spaces 24 and 25 are kept open for the material which falls down through said spaces; they thus prevent the generator from becoming choked, which otherwise would certainly occur. In order to prevent the calcium carbide dust and the calcium hydroxide dust whirled up from attaching to the stirring arms and simultaneously clogging the spraying nozzles 26, fixed wipers 48 are mounted to extend somewhat below the nozzles by suspension from the plates immediately above said nozzles. The gas-outlet branch 30 is provided with a heating jacket and an endless screw 49 for preventing any other clogging and incrustation which might occur.

If at the gasification of the calcium carbide a larger quantity of water is used for some time than is required for the decomposition of the calcium carbide and for the removal of the reaction heat evolved, the calcium hydroxide becomes moister than it is desired and the power required for the revolution of the stirring element of the generator increases. In order to overcome this drawback and to recognize immediately when the calcium hydroxide becomes too moist, the stirring element of the generator may be driven by a separate motor; by mounting an electrical measuring instrument 50, for instance an ammeter, a wattmeter or the like, the increased consumption of electric energy of the driving motor can be measured and any overload of the stirring element of the generator be perceived. It can thus immediately be determined when the calcium hydroxide becomes too moist and preventive measures can be taken.

This application is in part a continuation of our co-pending U. S. patent application Serial No. 338,433 filed on February 8, 1929.

We claim:

1. In an apparatus for preparing acetylene and simultaneously producing substantially dry calcium hydroxide by the action of water on calcium carbide, comprising a vertical cylindrical reaction chamber provided with a series of superimposed fixed plates in staggered relation and stirring arms adapted to agitate the calcium carbide and the calcium hydroxide obtained therefrom on said plates and feed them from one plate to another, in combination, a collection chamber at the lower end of the reaction chamber for receiving the calcium hydroxide produced, means operated by the difference in pressure between said collection chamber and the reaction chamber for indicating the amount of calcium hydroxide in said collection chamber, and gas-tight means for removing calcium hydroxide from said collection chamber.

2. In an apparatus for preparing acetylene and simultaneously producing substantially dry calcium hydroxide by the action of water on calcium carbide, comprising a vertical cylindrical reaction chamber provided with a series of superimposed fixed plates in staggered relation and stirring arms adapted to agitate the calcium carbide and the calcium hydroxide obtained therefrom on said plates and feed them from one plate to another, in combination, gas-tight means for feeding calcium carbide to said reaction chamber, a collection chamber at the lower end of said reaction chamber for receiving the calcium hydroxide produced, gas-tight means for removing calcium hydroxide from said collection chamber, and means operated by the difference in pressure between said collection chamber and the reaction chamber for indicating the amount of calcium hydroxide in said collection chamber.

3. In an apparatus for preparing acetylene and simultaneously producing substantially dry calcium hydroxide by the action of water on calcium carbide, comprising a vertical cylindrical reaction chamber provided with a series of superimposed fixed plates in staggered relation and stirring arms adapted to agitate the calcium carbide and the calcium hydroxide obtained therefrom on said plates and feed them from one plate to another, in combination, gas-tight means for feeding calcium carbide to said reaction chamber, a collection chamber at the lower end of said reaction chamber for receiving the calcium hydroxide produced, gas-tight means for removing calcium hydroxide from said collection chamber, and means comprising a socket affixed to said collection chamber provided with an endless screw, a heating jacket and a dust separator and a manometer having one of the arms connected to said socket and its other arm connected to said reaction chamber for indicating the amount of calcium hydroxide in said collection chamber.

4. In an apparatus for preparing acetylene and simultaneously producing substantially dry calcium hydroxide by the action of water on calcium carbide, comprising a vertical cylindrical reaction chamber provided with a series of superimposed fixed plates in staggered relation and stirring arms adapted to agitate the calcium carbide and the calcium hydroxide obtained therefrom on said plates and feed them from one plate to another, in combination, means on said stirring arms for keeping the passages between said staggered plates clear for the passage of the starting material from one plate to the next, wipers suspended from each individual plate for preventing the coating of said stirring arms with the material under treatment, a collection chamber at the lower end of the reaction chamber for receiving the calcium hydroxide produced, gas-tight means for removing calcium hydroxide from said collection chamber and means for indicating the amount of calcium hydroxide in said collection chamber.

5. In an apparatus for preparing acetylene and simultaneously producing substantially dry calcium hydroxide by the action of water on calcium carbide, comprising a vertical cylindrical reaction chamber provided with a series of superimposed fixed plates in staggered relation and stirring arms adapted to agitate the calcium carbide and the calcium hydroxide obtained therefrom on said plates and feed them from one plate to another, in combination, means for delivering a pre-determined amount of water to each plate, means for indicating when the pre-determined amount of water is exceeded, a collection chamber at the lower end of the reaction chamber for removing the calcium hydroxide produced and gas-tight means for removing calcium hydroxide from said collection chamber.

6. In an apparatus for preparing acetylene and simultaneously producing substantially dry calcium hydroxide by the action of water of calcium carbide, comprising a vertical cylindrical reaction chamber provided with a series of superimposed fixed plates in staggered relation and stirring arms adapted to agitate the calcium carbide and the calcium hydroxide obtained therefrom on said plates and feed them from one plate to another, in combination, means for delivering a pre-determined amount of water to each plate, means operated by the power used to drive said stirring arms for indicating when the pre-determined amount of water is exceeded, a collection chamber at the lower end of said reaction chamber for receiving the calcium hydroxide produced and gas-tight means for removing calcium hydroxide from said collection chamber.

KARL WEIBEZAHN.
FELIX WALTER.